Feb. 9, 1971  F. WEBER  3,561,928

GAS PURIFYING APPARATUS

Filed Oct. 27, 1967  2 Sheets-Sheet 1

Inventor:
FRITZ WEBER
Steinberg & Blake
attys

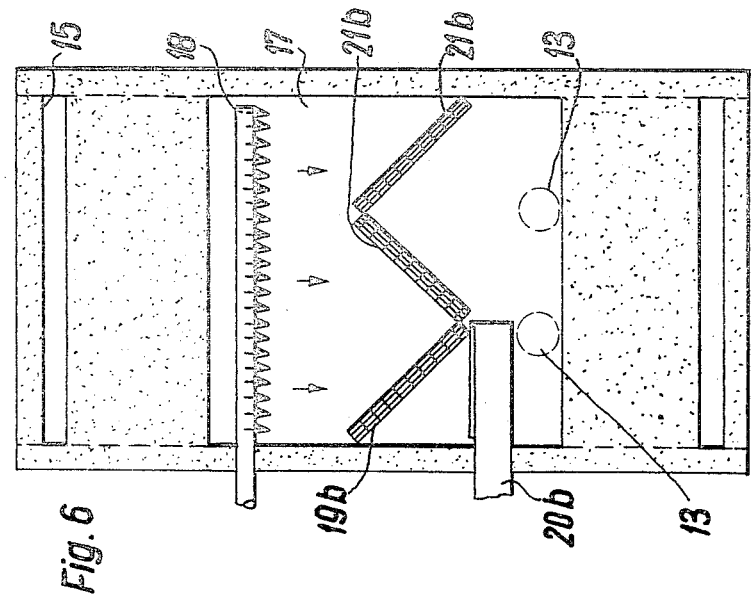
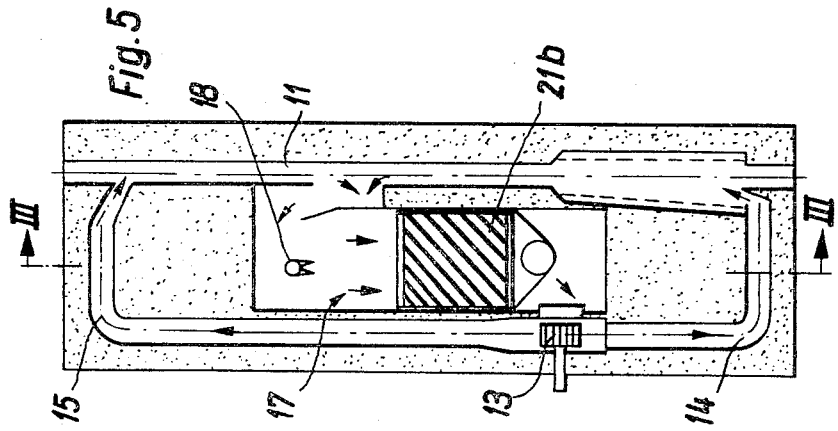

United States Patent Office 3,561,928
Patented Feb. 9, 1971

3,561,928
GAS PURIFYING APPARATUS
Fritz Weber, Wahnheide, Germany, assignor to Electro-Isolier-Industrie Wahn, Wilhelm Ruppert, Wahn, Rhineland, Germany
Filed Oct. 27, 1967, Ser. No. 678,719
Claims priority, application Germany, Oct. 31, 1966,
P 16 04 865.0
Int. Cl. B01j 9/04; F26b 13/02, 21/06
U.S. Cl. 23—288
10 Claims

ABSTRACT OF THE DISCLOSURE

A gas purifying apparatus to be used in connection with the treatment of work with a gas from which products are to be removed before the gas is discharged to the outer atmosphere. A circulating means circulates the gas first into engagement with the work so as to treat the latter and then along a return away from the work and back into engagement with the work. A discharge means communicates with this return for discharging a fixed fraction of the gas which flows therethrough out to the outer atmosphere. A discharge catalyzer means is situated in the path of flow of this fraction of the gas to the discharge means to remove from this fraction of the gas at least part of the products suspended therein before the fraction of the gas is discharged out through the discharge means. A recirculating catalyzer means is situated in the path of flow of the remainder of the gas flowing through the return so as to remove at least part of the products suspended in this remainder of the gas. The discharge catalyzer means has with respect to this fixed fraction of the gas which flows out through the discharge means an effective surface area which is substantially greater than the effective surface area of the recirculating catalyzer means with respect to the remainder of the gas which is recirculated back into engagement with the work, so that the discharge catalyzer means necessarily operates with an efficiency which is substantially greater than that with which the recirculating catalyzer means operates.

BACKGROUND OF THE INVENTION

The present invention relates to apparatus for treating work with a gas from which products must be at least partly removed before the gas is discharged to the outer atmosphere.

Thus, the invention may be used in connection with apparatus for coating wires, tapes, or the like with coatings of enamel, lacquer, etc. which insulate the wires or tapes.

In apparatus of this general type it is necessary to clean the gas before the latter is discharged to the outer atmosphere, and for this purpose it is known to use a catalyzer which is located in the path of gas flow so as to remove from the gas at least part of the products suspended therein.

Thus, with apparatus of the above general type there is the important problem of eliminating undesired odors of fumes resulting from products which are suspended in the gas, so as to prevent such fumes and products from being received in the outer atmosphere. In the coating of wire or the like with enamel, the wire is directed through a stove in which there will be combustion products in the form of phenols, cresols, and, to a lesser extent, ammonia. Because of recent campaigns against pollution of the atmosphere, there are in most parts of the world official governmental regulations as to the extent to which fumes of the above type may be discharged into the air in the neighborhoods where the factories or plants which operate with these fumes are located. It is possible for the government to measure the portion of undesired combustion products discharged into the air, and in the event that the permissible legal limit is exceeded, there can be legal proceedings and work stoppages which may be very expensive.

It is already known to provide for installations of the above general type a nickel-chromium gauze catalyzer which is coated with platinum and which is built into the area of the combustion chamber, particularly in a horizontal direction. The air which is circulated in this stove passes through the catalyzer and is for the most part recirculated to repeatedly engage the work so as to effect operations such as varnish drying, for example. However, part of the gas is drawn off and discharged through a suitable ventilator out through a chimney or stack to the outer atmosphere. It is essential, therefore, with an installation of this type to have the catalyzer arranged so as to extend across a large surface area, because a large quantity of air must be circulated and because at the same time the air which is discharged to the outer atmosphere must have a degree of purity conforming to the limitations set by the governmental regulations.

It has already been proposed to combine together a pair of substantially flat catalyzers which meet at an angle providing a peaked assembly, but this arrangement has provided no substantial improvement because the area of the catalyzers is too small to achieve sufficient purification, so that the problem resulting from the fact that the catalyzers are not great enough to achieve the desired results remains.

In order to achieve the desired results within a combustion chamber of a given cross section, it would be essential to use an extremely large and, therefore, very expensive catalyzer. Inasmuch as the entire cross section of flow of the gas must be completely purified, there is insufficient space available to provide in a combustion chamber a catalyzer which is large enough. The proposal of arranging a plurality of catalyzers one behind the other only increases the cost of the equipment and also increases the resistance to gas flow, rendering the operation impossible from a practical standpoint because of the throttling of the gas with the resultant resistance to he flow thereof. The cost factor is of particular significance in this connection, because in order to provide an efficiently operating catalyzer for an efficiently operating stove a cost on the order of $12,500.00 would be required.

SUMMARY OF THE INVENTION

It is accordingly a primary object of the present invention to provide for purifying of gases in installations of the above general type while eliminating the problems and drawbacks which are unavoidable in conventional apparatus.

Thus, it is an object of the present invention to provide a catalyzer arrangement which will give a purification which is at least as effective as that which has been heretofore achieved but at a cost which is greatly reduced as compared to the costs for conventional apparatus.

It is also an object of the present invention to provide for the gas a relatively unthrottled, effective circulation of low resistance.

Also, it is an object of the invention to provide for improving the extent of purification without increasing costs.

In accordance with the invention the gas is circulated first into engagement with the work so as to treat the latter and then along a return away from and back into engagement with the work. At this latter return there is situated a discharge means for discharging from the return a fixed fraction of the gas which flows therethrough, and this discharge means discharges this latter fraction of the gas out to the outer atmosphere. A discharge catalyzer means is situated in the path of flow of this fraction of the gas to the discharge means so as to remove at least part of the products therefrom and thus purify the discharged gas to a given extent. A recirculating catalyzer means is situated in the return in the path of flow of substantially the entire remainder of the gas flowing along the return back into engagement with the work, so that only the recirculated gas passes through the recirculating catalyzer means while only the discharged gas passes through the discharge catalyzer means. In accordance with the invention the discharge catalyzer means has with respect to the fraction of the gas which is discharged to the outer atmosphere an effective surface area which is substantially greater than the effective surface area of the recirculating catalyzer means with respect to the remainder of the gas which is recirculated back into engagement with the work.

According to one embodiment of the invention the discharge catalyzer means has with respect to the fixed fraction of the gas which flows therethrough an effective surface area which is approximately four times as great as the effective surface area of the recirculating catalyzer means with respect to the remainder of the gas which flows therethrough back into engagement with the work. Thus, while there may be 100% utilization of the recirculating catalyzer means, there will only be 25% utilization of the discharge catalyzer means, with this particular ratio. Therefore, in accordance with the concept of the present invention the recirculated gas and discharge gas are respectively treated separately and in functionally correct manners, respectively.

A highly effective purification of the recirculated gas which again reaches the work in a tunnel or the like where enameling and drying takes place, for example, and which has additional combustion products added to its contents, is not at all essential, and the lack of any requirement of a high degree of purification of the recirculated gas also results from the fact that a relatively large volume of this latter gas is recirculated. Thus, in accordance with the invention, a highly effective purification by the catalyzer means is provided primarily only for the gas which is discharged to the outer atmosphere, and for this purpose the discharge catalyzer means, in accordance with a further feature of the invention, is situated directly at the discharge means through which the gas is discharged to the outer atmosphere, this discharge catalyzer means even being carried by and directly contacting the discharge means.

As a result of this arrangement of the present invention the gas which is discharged to the outer atmosphere will be acted upon by a catalyzer means which actually is capable of handling a much greater amount of air, such as, for example, four times the amount of air which is actually discharged, as set forth in the above example. Since, for example, the volume of the gas which is recirculated will be approximately six times that of the gas which is discharged to the outer atmosphere, the discharge catalyzer means can have a relatively small effective surface area while nevertheless providing a highly effective purification. On the other hand, the recirculating catalyzer means is arranged and dimensioned in such a way that it is of a smaller effective surface area and lesser efficiency with respect to the recirculated gas, as compared to catalyzers in conventional installations wherein the recirculated air is also directed through the latter catalyzers, and this smaller effective surface area and lesser efficiency can be provided with the apparatus of the invention because the recirculated gas does not reach the outer atmosphere.

Various arrangements of the catalyzers are possible with the present invention. According to one embodiment the discharge catalyzer means may be situated together with the discharge means upstream of the recirculating catalyzer means. According to another construction of the invention, however, the discharge catalyzer means may have a tubular configuration directly surrounding an outlet pipe of the discharge means at an end of the latter which is suitably perforated, for example, so that after flowing through the discharge catalyzer means the gas will enter through the perforations into the pipe to be discharged therethrough to the outer atmosphere.

With structures of the above type a substantially unthrottled uniform distribution of the gas to the recirculating catalyzer means is achieved.

With other arrangements of the invention it is possible to provide a relatively flat catalyzer having sections of plate configuration arranged longitudinally with respect to each other, and such an arrangement can be used for the discharge catalyzer means, providing in this way also an effective distribution of the gas and a catalyzer installation of relatively large surface area even when used in relative small combustion chambers.

It is not essential, in accordance with the invention, to have the discharge catalyzer means situated upstream of the recirculating catalyzer means. Instead, it is also possible to have the discharge and recirculating catalyzer means arranged in a row one next to the other in substantially side-by-side relation, with these catalyzers extending at different angles so as to meet at a peaked intersection, with the fixed fraction of the gas which passes through the discharge catalyzer means being the only gas which is directed to the outer atmosphere through the discharge means, while the remainder of the gas which is purified to a lesser degree is recirculated back into engagement with the work.

BRIEF DESCRIPTION OF THE DRAWINGS

The invention is illustrated by way of example in the accompanying drawings, which form part of this application and in which:

FIG. 5 is a longitudinal sectional elevation diagrammatically illustrating a third possible embodiment of a structure of the present invention; and FIG. 6 is a transverse section of the structure of FIG. 5 taken along line III—III of FIG. 5 in the direction of the arrows.

DESCRIPTION OF PREFERRED EMBODIMENTS

Figure 1:
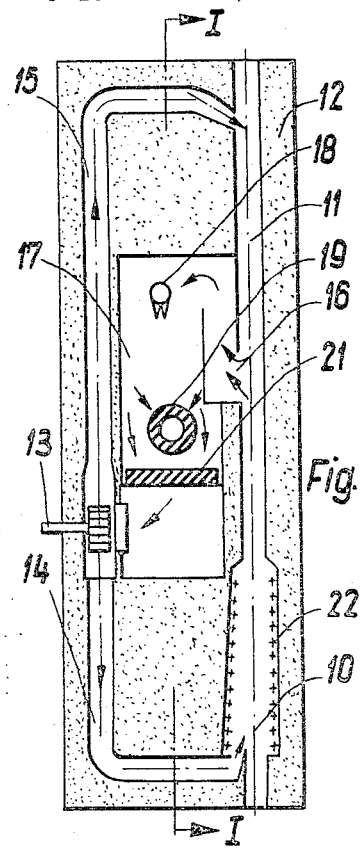
FIG. 1 is a longitudinal sectional elevation diagrammatically illustrating one possible embodiment of an enamelling stove shown in FIG. 1 together with its enamelling and drying tunnel, with its burner, and with the catalyzer structure of the invention.

Referring to FIG. 1, the work in the illustrated example takes the form of a wire 10 which is coated with enamel and which continually advances longitudinally through the drying tunnel 11 of the stove 12 in an upward direction, as viewed in FIG. 1.

A circulating means is provided for circulating a treating gas first into engagement with the work 10 and then along a return away from the work 10 and back into engagement with the latter. This circulating means includes the rotary fans or ventilators 13, and as is apparent from FIG. 2 there are a pair of such ventilating fans 13 in the illustrated example. The return along which the treating gas flows includes a relatively wide passage 14 of substantially rectangular cross section formed by the wall structure of the stove 12, this passage 14 of the return being located at the lower part of the stove while the wall structure thereof also defines a similar upper passage 15.

The passage 14 communicates at its lower end with the inlet end of the tunnel 11 while the passage 15 communicates at its upper end with the upper, outlet end of the tunnel 11, and of course both of the passages 14 and 15 of the return communicate with each other and with the rotary ventilating fans 13. Thus, the part of the gas which flows through the passage 14 of the return engages the work and flows concurrently with the work while the part of the gas which flows through the passage 15 of the return also engages the work but flows in countercurrent with respect to the upwardly moving work 10. In order to replace the gas which is discharged to the outer atmosphere, in a manner which is described below, fresh air is drawn in through the lower and upper ends of the tunnel 11.

The return of the circulating means includes the combustion chamber 17 which communicates through an opening 16 with the tunnel 11, so that after engaging the work the treating gas will initially flow into the combustion chamber 17. The fans 13 communicate with the downstream end of the combustion chamber, as is apparent from FIGS. 1 and 2. Within the combustion chamber is a burner 18 which receives a combustible gas which is burned so as to heat the treating gas which enters into the combustion chamber through the opening 16. The burner 18 extends substantially all the way across the combustion chamber 17, as is apparent from FIG. 2, substantially at the upper, upstream end of the combustion chamber.

Situated within the combustion chamber at a substantial distance below and downstream of the burner 18 is a discharge catalyzer means 19 through which a fixed fraction of the gas must pass before being discharged to the outer atmosphere by a discharge means 20 in the form of a suitable pipe, duct, conduit, or the like, leading from the combustion chamber to the outer atmosphere through a suitable stack or chimney, for example. The discharge catalyzer means 19 has a relatively large effective surface area which is contacted by the gas which is discharged, and it may be made of a chrome-nickel gauze which is coated with platinum. The discharge means 20 terminates within the combustion chamber 17 in a closed end but is formed in the region of its closed end and within the combustion chamber with a plurality of perforations all of which are surrounded by the tubular discharge catalyzer means 19 which in the illustrated example is of a cylindrical configuration and surrounds, engages, and is carried by the discharge means 20 at the elongated perforated portion thereof. Thus, all of the gas which is discharged by the discharge means 20 has to first pass through the catalyzer means 19.

The stove may, for example, have a temperature of 400° C., while the discharge catalyzer means 19 may have, for example, an area of 0.9 sq. m. The discharge means includes not only the outlet pipe but also the chimney which communicates therewith, and an exhaust fan (not shown) provides a discharge gas flow to the outer atmosphere which may, for example, be at the rate of 1000 cubic meters per hour.

Figure 2:
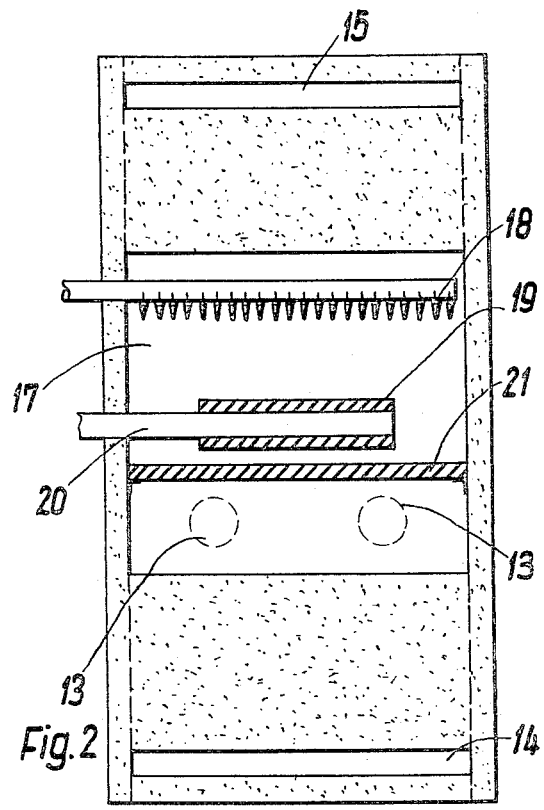
FIG. 2 is a transverse section of the structure of FIG. 1 taken along line I—I of FIG. 1 in the direction of the arrows.

As is apparent from FIGS. 1 and 2, the tubular, cylindrical configuration of the discharge catalyzer means provides not only a relatively large catalyzer surface area which can be accommodated in a relatively small combustion chamber, but in addition the remainder of the treating gas which is not discharged to the outer atmosphere passes without any substantial resistance in an almost completely unthrottled manner to a recirculating catalyzer means 21 in the form of a relatively flat plate extending across substantially the entire cross section of the combustion chamber 17 downstream of the discharge catalyzer means 19. Thus, this remainder of the treating gas which is not discharged to the outer atmosphere is distributed substantially uniformly with respect to the recirculating catalyzer means 21, and this latter catalyzing means 21 may have an effective surface area causing it to be 100% loaded and is of a relatively small effective surface area. For example, the recirculating catalyzer means 21 may also present to the gas which passes therethrough an area of only 0.9 sq. m., for example. Inasmuch as a considerably greater amount of treating gas passes through the recirculating catalyzer means 21 as compared to the amount which passes through the discharge catalyzer means 19, this recirculated treating gas is only moderately purified, as compared to the degree of purification of the discharged gas, and this recirculated remainder of the gas together with the fresh air which is drawn in to replace the discharged gas is sucked by the circulating fans 13 of the circulating means again into the passages 14 and 15 to be returned to the work. As is shown in FIG. 1, the interior of the tunnel 11 accommodates at the region of its inlet end an additional heating installation 22, as schematically illustrated.

Thus, the discharge catalyzing means 19 mounted on the discharge means 20 may have with respect to the fixed fraction of the gas which is discharged to the outer atmosphere an effective surface area which is approximately four times the effective surface area of the recirculating catalyzer means 21 with respect to the recirculated remainder of the gas. Inasmuch as the recirculating catalyzer means 21 is 100% loaded, the discharge catalyzer means 19 is utilized only to an extent of approximately 25% and provides a safety factor of 3.5–4 approximately, with respect to its operating life. When the catalyzer is 100% loaded, the degree of purification is not sufficient for gas which is discharged to the outer atmosphere and the catalyzer does not have any reserve so that after a relatively short period of time it will no longer be capable of effective use and must be reactivated at a cost which is approximately one third of the cost of a new catalyzer means. The structure of the invention, therefore, makes it possible to provide the discharge catalyzer means with a much longer operating life as well as with a satisfactory degree of purification and decontamination of the discharged gas from undesirable fumes and the like.

Figure 3:
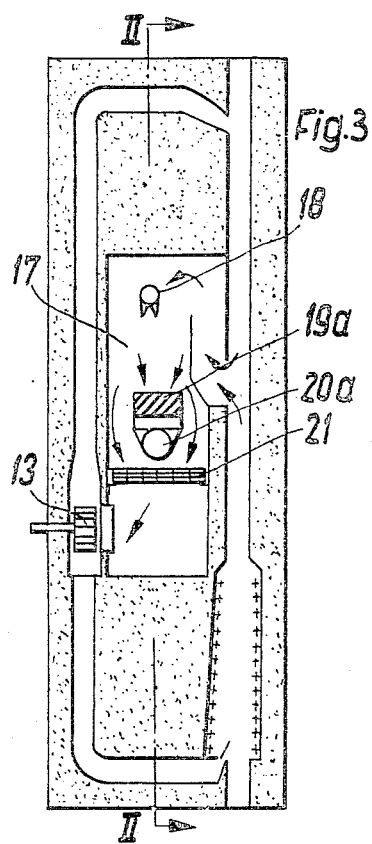
FIG. 3 is a longitudinal sectional elevation of another embodiment of an installation according to the invention, the structure being shown also diagrammatically in FIG. 3.
Figure 4:
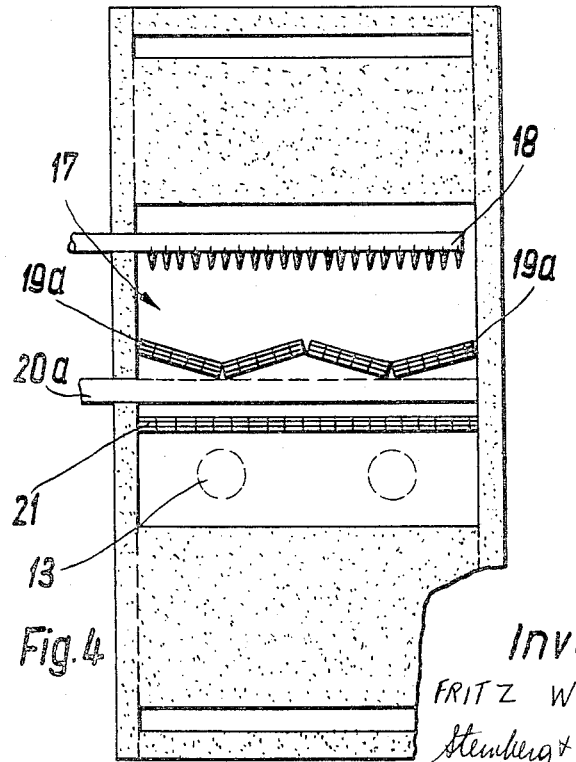
FIG. 4 is a transverse section of the embodiment of FIG. 3 taken along line II—II of FIG. 3 in the direction of the arrows.

According to the embodiment of the invention which is illustrated in FIGS. 3 and 4, the discharge catalyzer means 19a extends longitudinally across the combustion chamber 17 and is not of a tubular configuration. This discharge catalyzer means 19a has the undulating configuration shown in FIG. 4 and is carried at the inlet end of a hood whose outlet end communicates with the interior of the discharge means 20a through a suitable slot formed in the latter, for example. Thus, with this embodiment also all of the fraction of the treating gas which is discharged to the outer atmosphere by the discharge means 20a must first pass through the discharge catalyzer means 19a. This latter catalyzer means 19a is composed of a row of relatively flat sections of plate configuration situated in end-to-end relation across the interior of the combustion chamber 17 and inclined one with respect to the other so that they provide the peaked configuration shown in FIG. 4 where the pair of central catalyzer sections of the catalyzer means 19a intersect each other substantially at the center line or center of the combustion chamber 17. As is apparent from FIG. 3 there is a considerable free space before and behind the catalyzer means 19a and the discharge means 20a in the interior of the combustion chamber 17, so that in this case also there is a relatively unthrottled distribution of the remainder of the treating gas to the recirculating catalyzer means 21 with very little resistance to the flow of the gas thereto. Of course, the arrangement of the flat sections of the catalyzer means 19a in a row where they are oppositely inclined one with respect to the next enables the total length of the catalyzer means 19a to be increased as compared to the total length horizontally across the combustion chamber 17. In this way the catalyzer means 19a can present a greater treating surface to the discharge gas than if a straight horizontally extending catalyzer means were used, and the result is an exceedingly effective purification of the discharged gas.

It will be noted that in the above-described embodiments of the invention illustrated in FIGS. 1-4, the discharge catalyzer means 19 or 19a are arranged upstream of the recirculating catalyzer means 21, so as to provide a satisfactory purification of the gas from undesirable fumes and the like, but the invention, as is apparent from FIGS. 5 and 6, is not necessarily limited to such an upstream arrangement of the discharge catalyzer means with respect to the recirculating catalyzer means.

By way of a skillful arrangement of the discharge and recirculating catalyzer means it is possible to eliminate the situation of the discharge catalyzer means upstream of the recirculating catalyzer means.

Thus, as is apparent from FIGS. 5 and 6 it is also possible to situate the discharge catalyzer means 19b and the recirculating catalyzer means 21b at the same elevation within the combustion chamber 17. It will be noted from FIG. 6 in particular that the discharge means 20b extends into the combustion chamber 17 only through the horizontal extent thereof which is occupied by the discharge catalyzer means 19b, and through a suitable hood or baffle arrangement, as schematically indicated in FIG. 5, slots or perforations situated at the upper part of the discharge means 20b as viewed in FIG. 5, will receive only gas which has initially passed through the discharge catalyzer means 19b. Thus, the discharge pipe 20b extends only beneath the discharge catalyzer means 19b and communicates only with the latter so as to receive only that fraction of the treating gas which first passes through the discharge catalyzer means 19b. Of course, with a suitable arrangement of a baffle, hood, duct, or the like, it is possible to situate the pipe 20b at a different relationship with respect to the discharge catalyzer means 19b while still receiving only gas which has first passed through the discharge catalyzer means 19b.

The pair of catalyzer means 19b and 21b have the undulating configuration shown most clearly in FIG. 6, and with the illustrated arrangement the pair of catalyzer means include relatively flat, plate sections, the discharge catalyzer means 19b being formed by one plate section while the recirculating catalyzer means 21b is formed by a pair of plate sections which intersect each other at their ends to form the peaked configuration shown in FIG. 6. Thus, the catalyzer sections which are arranged in end to end relation in the row shown in FIG. 6 are inclined one with respect to the other so as to also achieve in this way a larger area within the relatively small combustion chamber 17. Moreover, with the illustrated inclined arrangement of the catalyzer sections there is in addition to a larger surface area a gas flow which is hydrodynamically improved because of the inclined arrangement of the catalyzer sections with respect to the direction of gas flow.

It is thus apparent that with the structure of the invention an exceedingly effective purification of the discharge gas is achieved with a structure which is of relatively small size and relatively low cost.

What is claimed is:

1. In an apparatus for treating work with a gas which at least after treatment of the work has suspended therein products which are to be at least partly removed from the gas before the latter is discharged to the outer atmosphere, means forming for a treating gas a return away from and then back to the work to be treated, circulating means for circulating the treating gas into engagement with the work to treat the latter and then along said return away from the work and back into engagement with the work, discharge means communicating with said return for discharging to the outer atmosphere a fixed fraction of the gas flowing along said return away from and back into engagement with the work, discharge catalyzer means situated in the path of flow of said fraction of said gas from said return to said discharge means for removing from said fixed fraction of said gas which flows through said discharge means to the outer atmosphere at least some of the products suspended therein, recirculating catalyzer means situated in the path of flow of substantially the entire remainder of said gas flowing along said return back to the work without being discharged through said discharge means, and said discharge catalyzer means having with respect to said fixed fraction of said gas an effective surface area which is substantially larger than the effective surface area of said recirculating catalyzer means with respect to said remainder of the gas, whereby said discharge catalyzer means acts on said fixed fraction of the gas which is discharged with an efficiency which is substantially greater than that with which said recirculating means acts on the gas which is recirculated back into engagement with the work.

2. The combination of claim 1 and wherein said discharge catalyzer means and said recirculating catalyzer means are situated in said return with said discharge catalyzer means located upstream of said recirculating catalyzer means.

3. The combination of claim 1 and wherein said discharge catalyzer means has a tubular configuration.

4. The combination of claim 1 and wherein said discharge catalyzer means and recirculating catalyzer means are arranged in a row one next to the other across the path of flow of the gas in said return.

5. The combination of claim 1 and wherein both of said catalyzer means respectively have approximately the same effective surface areas.

6. The combination of claim 1 and wherein said recirculating catalyzer means has an effective surface area greater than that of said discharge catalyzer means.

7. The combintion of claim 1 and wherein said discharge catalyzer means has a given capacity and is capable of handling a given maximum load of which only a relatively small part is formed by said fixed fraction of said gas, while said recirculating catalyzer means has a given capacity and is capable of handling a given maximum load which is substantially equal to said remainder of the treating gas.

8. The combination of claim 1 and wherein said remainder of the gas has a magnitude which is several times as great as said fixed fraction of the gas.

9. The combination of claim 1 and wherein said discharge catalyzer means has the configuration of a plurality of plates arranged one next to the other in end-to-end relation with one plate inclined with respect to the next.

10. The combination of claim 9 and wherein said return includes a combustion chamber in which said discharge means and discharge catalyzer means are located, and said discharge catalyzer means including at least two of said plates which extend longitudinally at least partly across said combustion chamber and which meet each other substantially at a central part of said chamber.

References Cited

UNITED STATES PATENTS

| | | | |
|---|---|---|---|
| 1,716,479 | 6/1929 | Bilsky | 23—288.3FUX |
| 2,658,742 | 11/1953 | Suter et al. | 23—288.3FX |
| 2,743,529 | 5/1956 | Hayes | 23—288.3FUX |
| 2,750,680 | 6/1956 | Houdry et al. | 23—288.3FUX |
| 2,795,054 | 6/1957 | Bowen | 23—288.3FUX |
| 3,106,386 | 10/1963 | Harris | 23—288.3FUX |
| 3,130,961 | 4/1964 | Verner et al. | 23—288.3FUX |
| 3,361,350 | 1/1968 | Genbauffe | 23—288.3FX |
| 3,395,972 | 8/1968 | Hardison | 23—288.3FX |
| 3,429,656 | 2/1969 | Taylor et al. | 23—288.3FX |

MORRIS O. WOLK, Primary Examiner

B. S. RICHMAN, Assistant Examiner

U.S. Cl. X.R.

23—277; 34—79,86, 155; 263—3